Figure 3B:
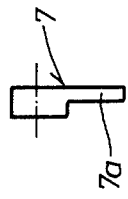

United States Patent [19]
Hennig et al.

[11] Patent Number: 4,722,452
[45] Date of Patent: Feb. 2, 1988

[54] TELESCOPIC COVER

[75] Inventors: Kurt Hennig, Munich; Albert Stöhr, Markt-Schwaben; Wolfgang Diels, Munich, all of Fed. Rep. of Germany

[73] Assignee: Gebr. Hennig GmbH, Fed. Rep. of Germany

[21] Appl. No.: 733,648

[22] Filed: May 13, 1985

[30] Foreign Application Priority Data

Jun. 7, 1984 [DE] Fed. Rep. of Germany ....... 3421248
Oct. 30, 1984 [DE] Fed. Rep. of Germany ....... 3439694

[51] Int. Cl.⁴ .............................................. B65D 6/12
[52] U.S. Cl. ......................................... 220/8; 206/408
[58] Field of Search ................. 220/23.4, 8, 408, 400, 220/401, 4 R

[56] References Cited

U.S. PATENT DOCUMENTS

| | | | |
|---|---|---|---|
| 1,827,396 | 10/1931 | Luckett | 220/8 |
| 2,446,808 | 7/1953 | Yenne | 220/408 |
| 2,998,893 | 9/1961 | Thomas | 220/8 |
| 3,116,744 | 1/1964 | Hager | 220/408 |
| 3,454,151 | 7/1969 | Plaskan | 220/8 |
| 3,622,029 | 11/1969 | Ware | 220/8 |
| 3,747,754 | 7/1973 | Nix et al. | 220/23.4 |
| 3,819,081 | 6/1974 | Runte | 220/408 |
| 3,851,936 | 12/1974 | Muller | 220/23.4 |
| 3,971,360 | 7/1976 | Spoeth, Jr. | 220/408 |
| 4,058,995 | 11/1977 | Greaves | 220/8 |
| 4,303,154 | 12/1981 | Hicks | 220/8 |
| 4,624,382 | 11/1986 | Tontareui | 220/8 |

Primary Examiner—Joseph Man-Fu Moy
Attorney, Agent, or Firm—Learman & McCulloch

[57] ABSTRACT

The invention relates to a telescopic cover composed of multiple boxes in which three guide elements are provided for guiding two adjacent boxes in the region of each side wall, and of these at least one guide element extends over the length of the appertaining box by a specific dimension in the extended state of the two boxes and furthermore at least one of the three guide elements is releasable from the appertaining box. In this way a small compressed dimension of the telescopic cover can be produced even with very wide boxes and at the same time a self-supporting construction can be achieved in a simple manner which saves on material.

27 Claims, 36 Drawing Figures

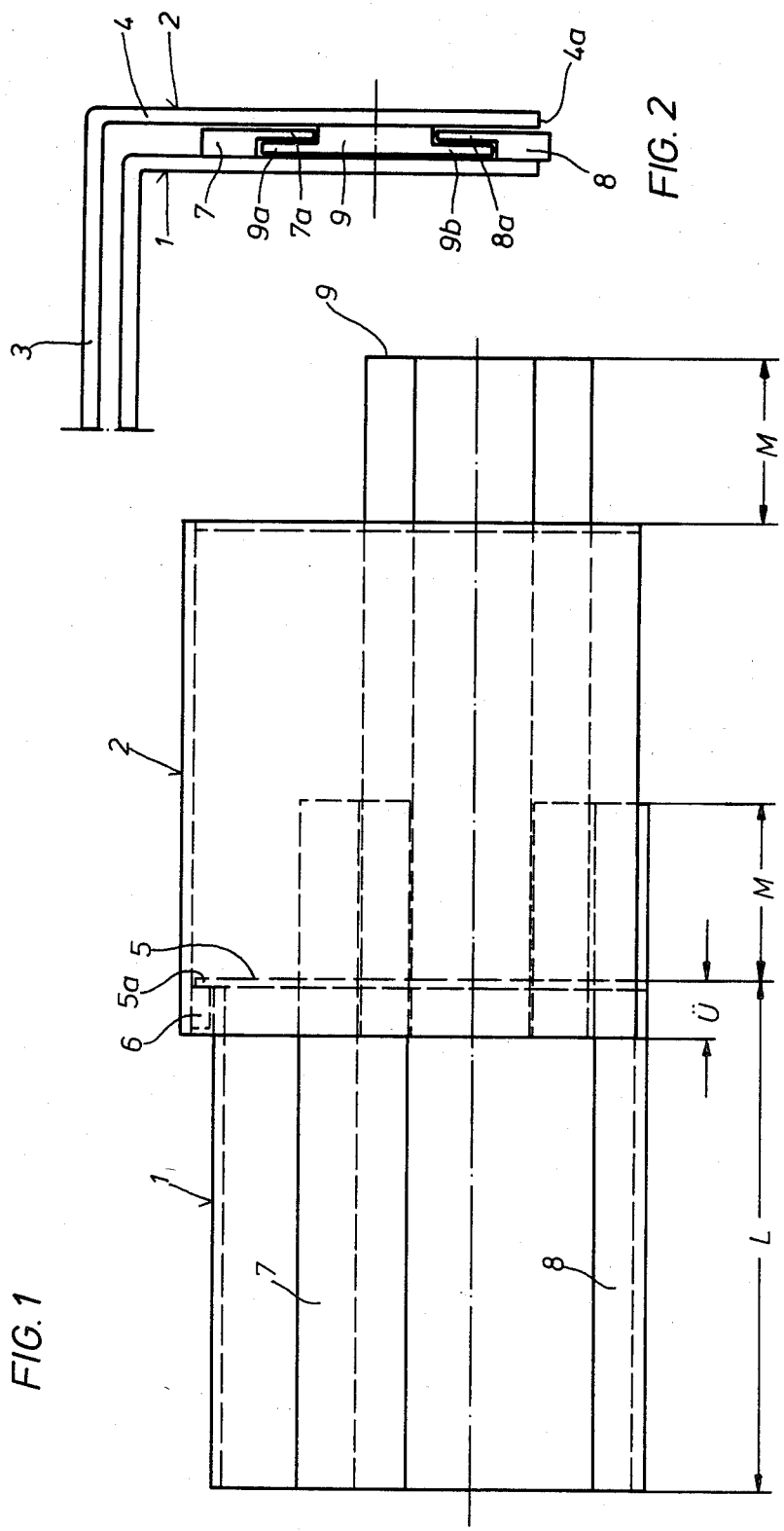

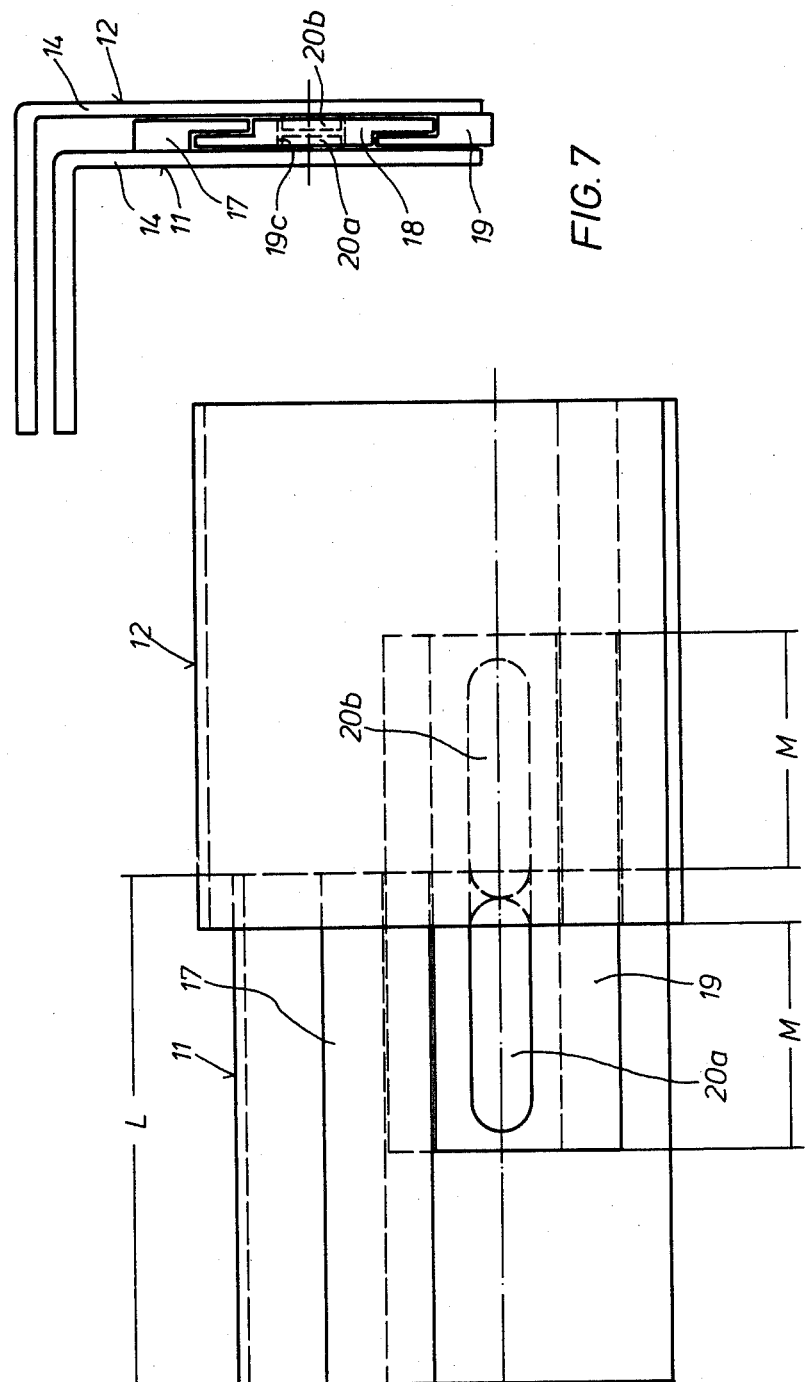

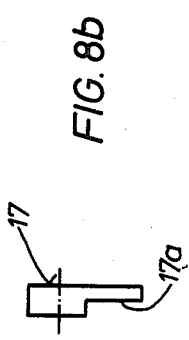
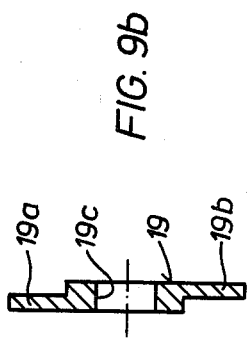
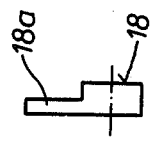
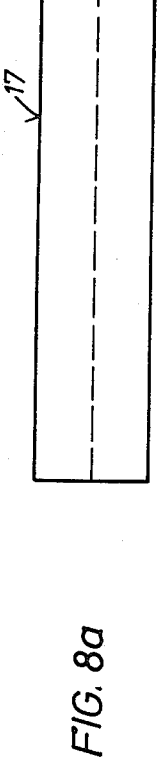
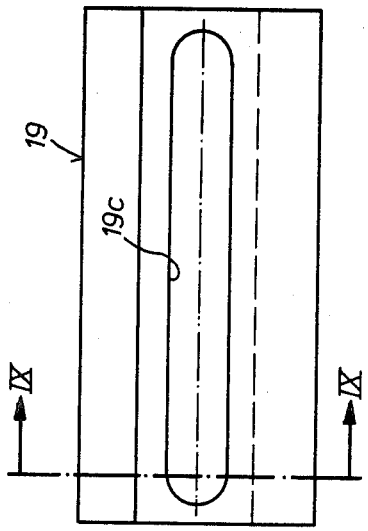
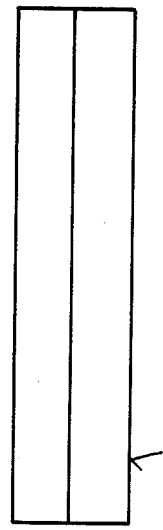

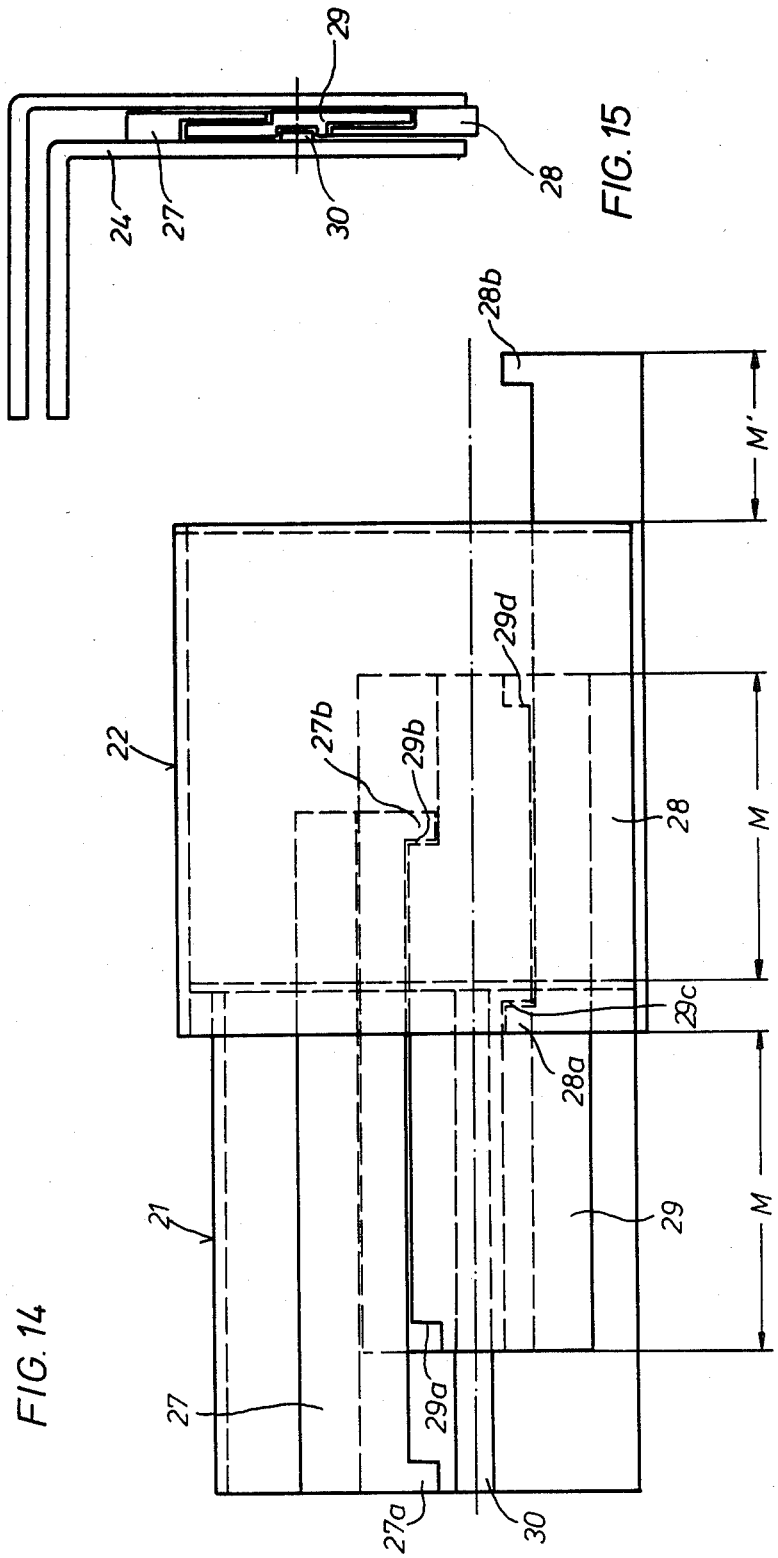

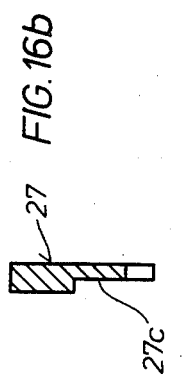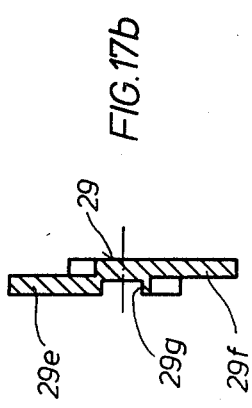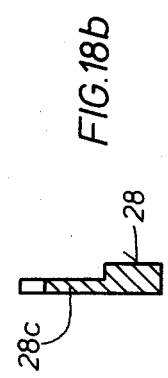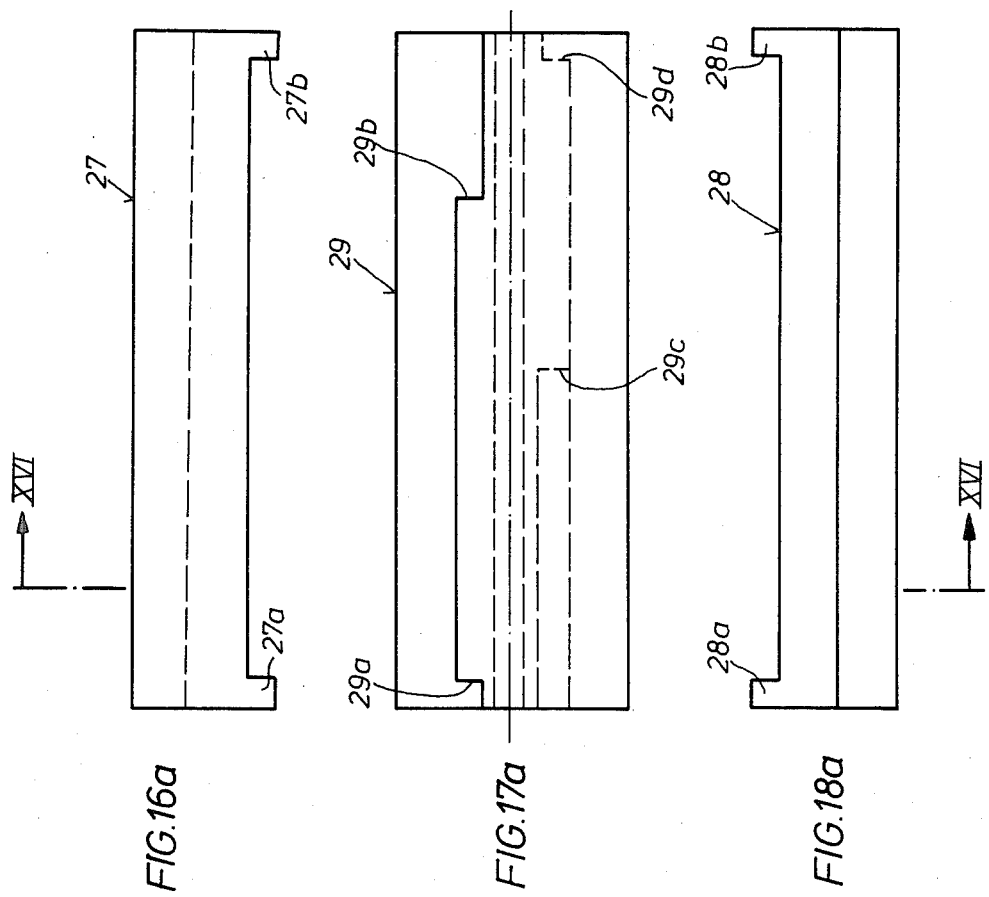

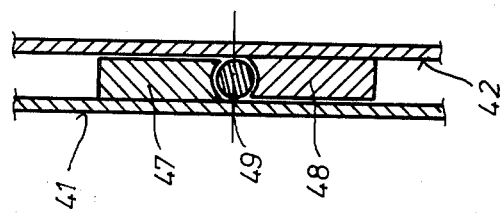
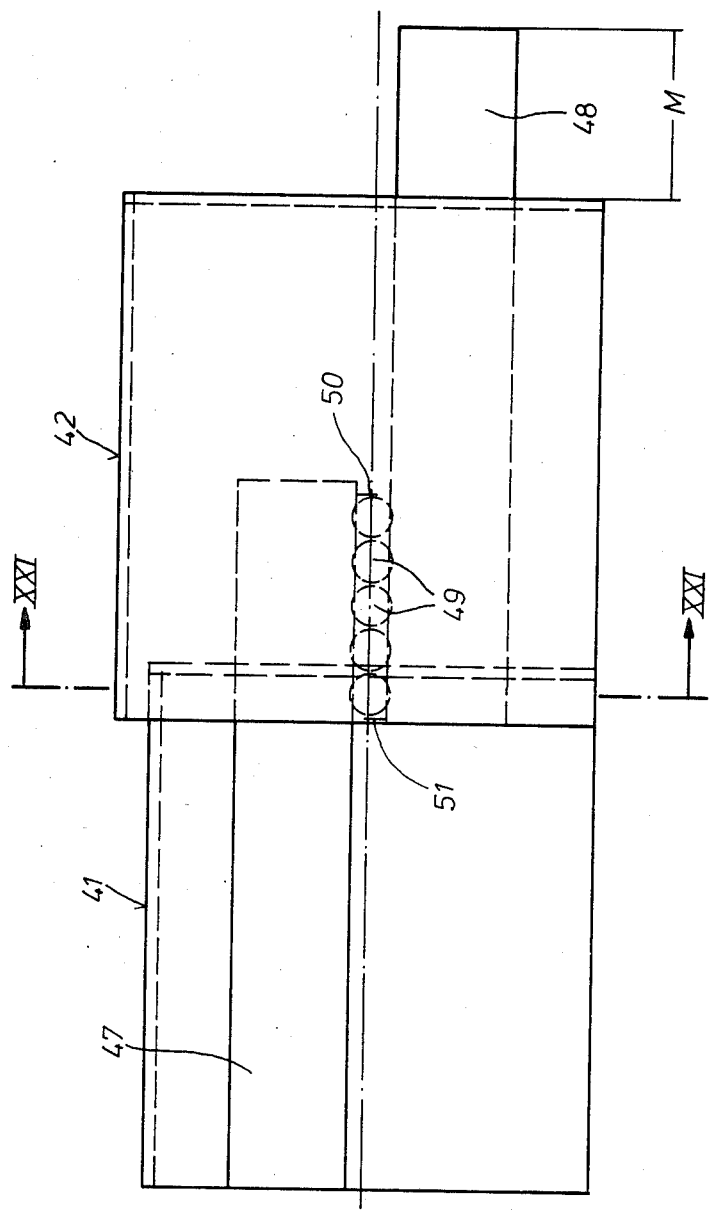
FIG. 21
FIG. 20

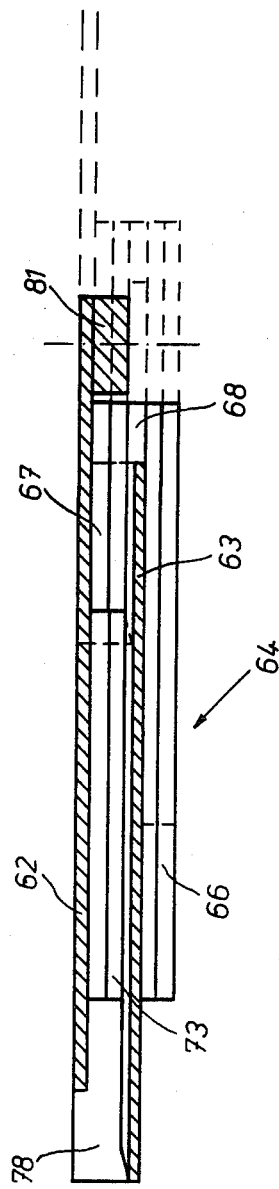
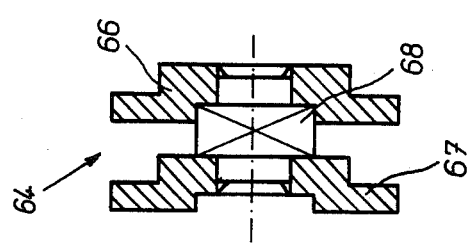
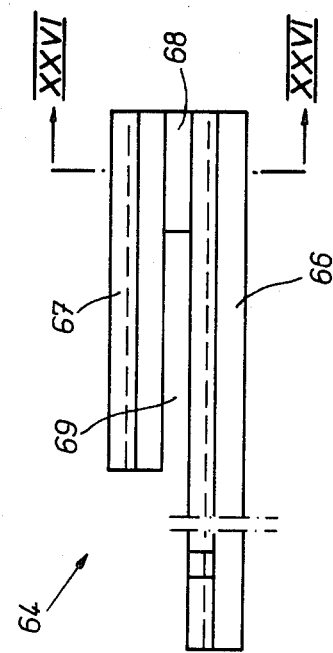
FIG. 24
FIG. 26
FIG. 25

TELESCOPIC COVER

The invention relates to a telescopic cover according to the preamble to claim 1.

Telescopic covers of the type set out in the preamble to claim 1 are used on machine tools and on comparable equipment. An important requirement of the user is that the compressed dimension of the telescopic cover should be as small as possible since with a given overall length of the machine the usable working stroke of the machine is reduced by the compressed dimension (i.e. by the length of the telescopic cover in the compressed state).

However, to provide a small compressed dimension for the telescopic cover has proved to be more difficult the greater the desired width of the cover is. In fact, practical experience has shown that a specific ratio of box width of box depth (the latter calculated in the longitudinal direction of the telescopic cover) should not be exceeded if tilting and thus impeded movement of the telescopic cover are to be avoided.

In order to be able to exceed the said empirical value (ratio of box width to box depth) in particular in the case of very wide covers it is known for scissor members which couteract tilting of the boxes to be arranged between the individual boxes. However, such scissor members require a considerable additional expenditure and result in an undesirable increase in the compressed dimension of the cover when there are a certain number of boxes and the dimensions of the scissor set exceed the compressed dimension of the cover.

A telescopic cover of the general type to which the invention relates is known (German Patent Specification No. A-26 20 145) and in which the guide elements provided on the side walls of two successive boxes for slidably movable longitudinal guiding of these boxes are constructed as follows: a strip-shaped guide element which extends over the length of the larger box and terminates at the end faces of the box is mounted on the inside of the box by means of rivets. A plurality of comparatively short upper and lower guide elements are welded onto the outside of the side wall of the smaller cover box.

In this known telescopic cover the individual cover boxes have an overlap corresponding to approximately half of the box depth in the fully extended state of the telescopic cover. This extraordinarily large overlap is necessary in the known construction for the guide elements provided on the adjacent cover boxes to engage with one another over a sufficient length.

A significant disadvantage of the known telescopic cover is that a large amount of material is required because of the necessary large overlap of the individual cover boxes, which means that the weight of the telescopic cover is correspondingly high. In this known telescopic cover difficulties are also created by assembly and dismantling because of the guide elements which are riveted and welded on.

The object of the invention, therefore, is to construct a telescopic cover of the type described in such a way that in a simple manner which saves on material a particularly small compressed dimension can be achieved even in the case of a very wide telescopic cover.

Figure 12:
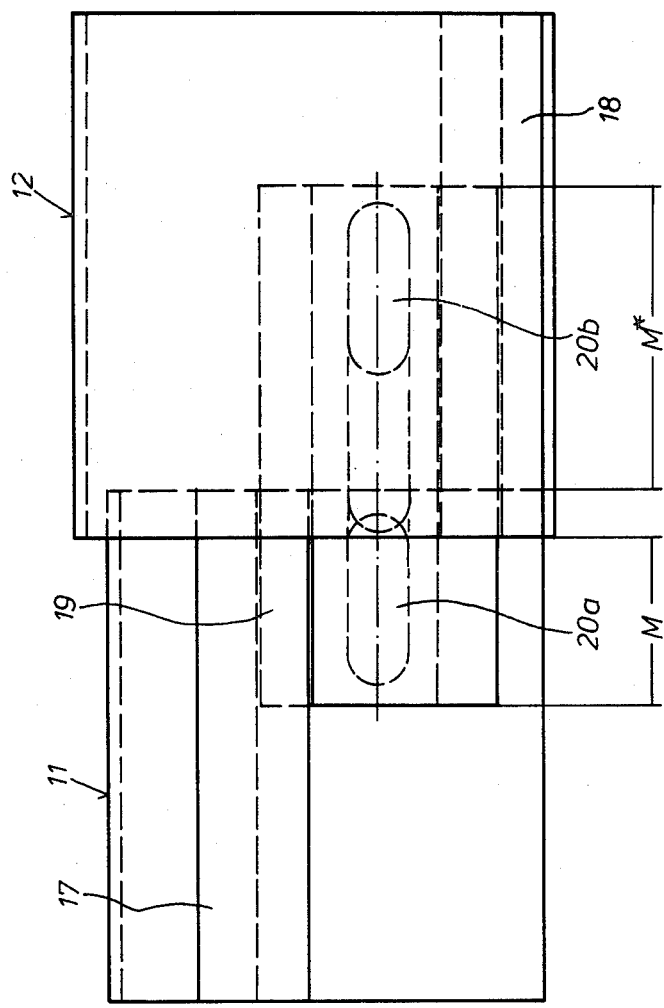
Figure 19:
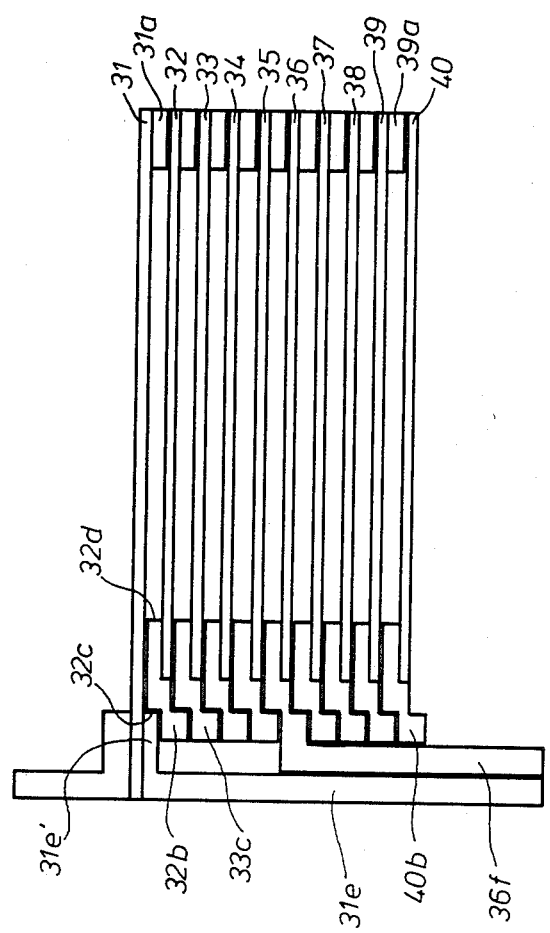
Figures 22, 23:
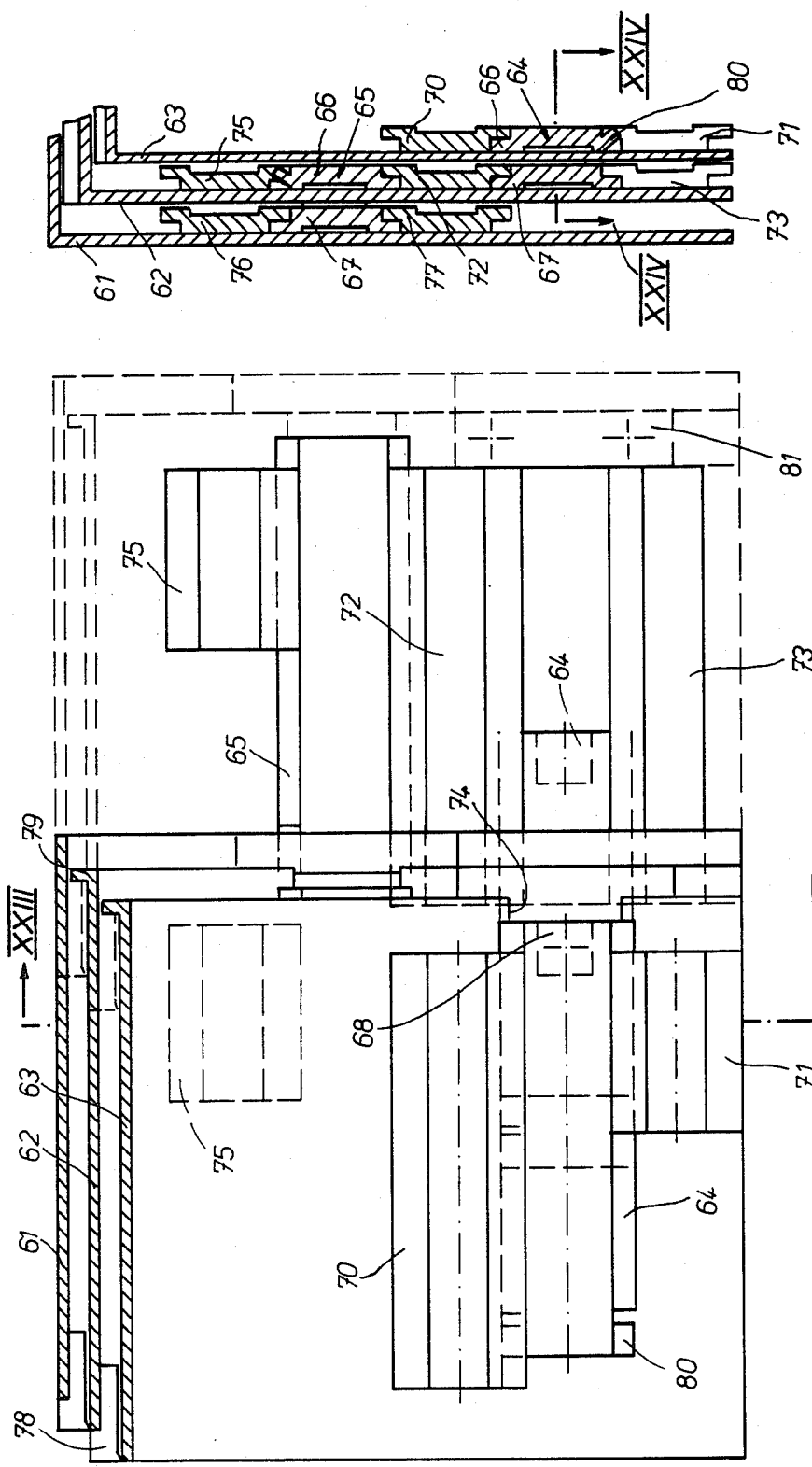

Advantageous embodiments of the invention are explained in greater detail in the following description and illustrated in the drawings, wherein:

FIG. 1 shows a schematic side view of two boxes of a first embodiment of the invention, FIG. 2 shows a partial front view of FIG. 1, FIGS. 3 to 5 show details (side view and front view respectively of the guide elements of the cover according to FIG. 1 and FIG. 2), FIG. 6 shows a side view of a second embodiment of the invention, FIG. 7 shows a partial front view of FIG. 6, FIGS. 8 to 10 show side, end and sectional views of the guide elements of the embodiment according to FIGS. 6 and 7, FIG. 11 shows the stop of the embodiment according to FIGS. 6 and 7, FIG. 12 shows a variant of the embodiment according to FIG. 6, FIG. 13 shows a side view and section of the inner guide element of FIG. 12, FIG. 14 shows a side view of a further embodiment of the invention, FIG. 15 shows a partial front view of FIG. 14, FIGS. 16 to 18 show side and sectional views of the guide elements of the embodiment according to FIGS. 14 and 15, FIG. 19 shows a schematic representation of a telescopic cover according to the invention in the compressed state (to illustrate the stop limiting the extending movement), FIGS. 20 and 21 show side and sectional views of a further embodiment, FIG. 22 shows a side view of a further embodiment, FIG. 23 shows a section along the line XXIII—XXIII in FIG. 22, FIG. 24 shows a section along the line XXIV—XXIV in FIG. 23, FIG. 25 shows a side view of the slide according to FIGS. 22 to 24, FIG. 26 shows a section along the line XXVI—XXVI of FIG. 25.

A first embodiment of the telescopic cover according to the invention is illustrated in FIGS. 1 to 5. For the sake of simplicity only two boxes are illustrated of the telescopic cover which consists of a plurality of boxes which can be telescoped into one another, and in order to simplify understanding only those guide elements are shown which are provided between these two boxes.

The boxes 1 and 2 each comprise in a known manner a top wall 3, two side walls 4 (of which only one side wall is visible in FIG. 2) and a rear wall 5. The extending movement of the boxes is limited by the upper edge 5a of the rear wall of the box 1 coming to rest on a stripper 6 which is only shown schematically and is provided on the underside of the top wall 3 of the next larger box 2 near the front edge of this top wall 3.

To guide the boxes 1 and 2 in their relative movement (i.e. during extension and compression of the telescopic cover) three guide elements 7, 8 and 9 are provided of which the two outer guide elements 7 and 8 are provided on the outer surface of the side wall 4 of the box 1, whilst the inner guide element 9 is arranged on the inner surface of the side wall 4 of the larger box 2. Here and in the following text only the guide elements provided in the region of one side wall of each cover box are described; an identical system of guide elements is also provided on the other side wall of each box.

Figure 4B:
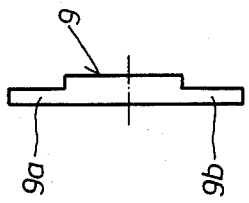
Figure 5B:
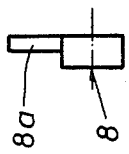
Figure 3A:
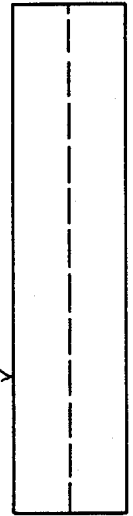
Figure 4A:
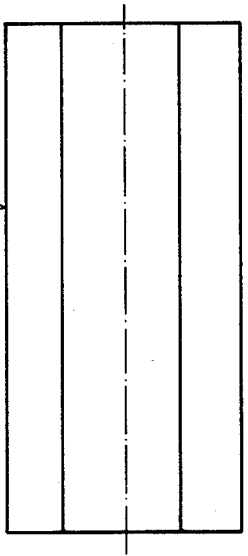
Figure 5A:
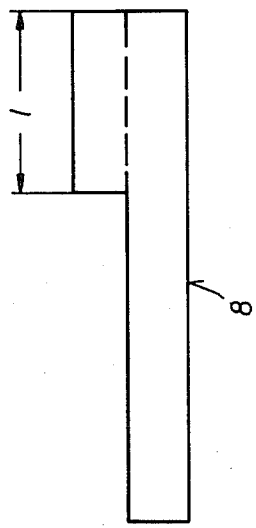

The shape of the guide elements 7, 8 and 9 can be seen in detail from FIGS. 3 to 5; FIG. 2 shows how they interengage. All three guide elements 7, 8 and 9 extend over the whole length L of the appertaining box 1 or 2 and project by a dimension M beyond the length of this box.

The guide element 7 has an L-shaped cross-section and forms a downwardly open groove 7a which serves for engagement of a flange 9a of the inner guide element 9. In a corresponding manner the other outer guide element 8 is constructed in a part 1 of its length (cf. FIG. 5a) with an L-shaped cross-section and here forms a groove 8a in which a flange 9b of the inner guide element 9 engages. As FIG. 1 shows, the part 1 of the length of the guide element 8 which is provided with the groove 8a is chosen so that in the extended state of the cover (cf. FIG. 1) this groove is covered by the next larger box 2. This prevents shavings and other foreign bodies from falling into the upwardly open groove 8a.

The guide elements 7, 8 and 9 engage suitably in one another with a sliding clearance and ensure that the boxes 1 and 2 slide relative to one another without tilting when the telescopic cover is extended and compressed. In the fully extended state shown in FIG. 1 the parts of the guide elements projecting by the dimension M over the length of the appertaining box to some extent ensure an outer overlapping of the boxes resulting in a self-supporting system which does not require any individual support of the boxes on a stationary guide track.

On the other hand, when the telescopic cover is compressed the boxes 1 and 2 can move so far one into the other that their rear walls 5 lie directly against one another. This produces a minimal compressed dimension of the telescopic cover. The guide elements of the individual boxes project towards the right out of the last (largest) box of the telescopic cover by a maximum of the dimension M. For this purpose either the last box of the telescopic cover can be constructed so that it is longer by the dimension M or another suitable covering can be provided. The last lengthened box can optionally be cut out for the slide region.

In order for it to be possible to dismantle the telescopic cover in a simple manner at least one of the three guide elements 7, 8, 9 is releasably mounted on the appertaining box. If for example the inner guide element 9 is fixed on the box 2 by means of screws, then after these screws have been undone and the guide element 9 has been taken out the smaller box 1 can be lowered so that the engagement between the upper edge 5a of the rear wall 5 of the box 1 and the stripper 6 of the box 2 is released, so that the box 1 is free.

As a study of FIG. 1 will show in particular, in the extended state of the telescopic cover the overlap Ü between the boxes 1 and 2 is very small; in practice it corresponds to the thickness of the rear wall 5 and the depth of the stripper 6. Despite this small overlap Ü, which leads to a minimal material requirement for the whole telescopic cover, the dimension M by which the guide elements 7, 8 and 9 extend over the appertaining box 1 or 2 on the other hand ensures a reliable guiding of the boxes without tilting during the extending movement and a self-supporting rigid arrangement which does not require any individual support of the boxes on the guide track. It is also advantageous that the lower edge 4a of the side walls 4 of all boxes can be arranged at the same height, since because of the system of inter-engaging guide elements 7, 8, 9 it is not necessary to bend the side walls 4 at the lower edge (so that in each case the larger box engages under the next smaller box).

The guiding system described above with the guide elements projecting by a specific dimension M over the length of the respective box makes it possible to keep the box depth (length L) small in the desired manner, even in the case of a very large width of the boxes (at right angles to the drawing plane of FIG. 1), in order thereby to obtain a small compressed dimension of the telescopic cover.

For the understanding of the invention it should again be emphasised that in FIGS. 1 and 2 only the guide elements 7, 8 and 9 provided between the boxes 1 and 2 are shown. By contrast, the similarly constructed guide elements which are provided on the one hand between the box 1 and the next smaller box and on the other hand between the box 2 and the next larger box are not illustrated.

The embodiment according to FIGS. 1 to 5 is intended above all for applications in which there is sufficient space in the region of the largest box of the telescopic cover to accommodate the guide elements which project over the rear wall of the second largest box.

The embodiments of the invention which are explained below are, by contrast, advantageous in very confined spaces, since in these embodiments the guide system is accommodated completely inside the boxes and in the compressed state of the telescopic cover does not project over the length of the box.

In the embodiment according to FIGS. 6 to 11 three guide elements 17, 18, 19 are again provided in the region of the side walls 14 for guiding the boxes 11 and 12. One (17) of the two outer guide elements 17, 18 is connected to the outer surface of the side wall 14 of the box 11 and the other (18) to the inner surface of the side wall 14 of the box 12.

In this embodiment the inner guide element 19 is constructed as a slide which is slidably movable between two positions and in the extended state of the boxes 11, 12 projects by a specific dimension M over the right-hand end face of the box 11 or the left-hand box of the box 12 (these two projecting dimensions can of course be chosen so as to be different).

The shape of the three guide elements 17, 18, 19 can be seen in detail from FIGS. 8 to 10. The length of all three guide elements corresponds in this embodiment to the length L of the boxes 11, 12.

The outer guide elements 17, 18 have the shape of elongated strips of L-shaped profile. They are arranged so that they form grooves 17a, 18a for the engagement of flanges 19a, 19b of the inner guide element 19.

The inner guide element 19 which is constructed as a slide has a longitudinal slot 19c in which two stops 20a, 20b connected to the two boxes 11, 12 engage. These stops are of similar construction and are shown in FIG. 11.

As can be seen in particular from FIG. 7, the thickness of the stops 20a, 20b is somewhat smaller than the half thickness of the longitudinal slot 19c provided in the inner guide element 19. In addition they are arranged in two different planes which lie one behind the other (adjacent to one another in the sectional view in FIG. 7) and are offset relative to one another by at least half the thickness of the longitudinal slot 19c. Thus the arrangement is chosen so that the two stops 20a, 20b fit one another when the boxes 11 and 12 are drawn apart and pushed together and in the end positions take up a fixing position.

The longitudinal slot 19c provided in the inner guide element 19 is open over its whole length after the two broad sides of the guide element 19. The stops 20a, 20b which engage in the longitudinal slot 19c come to rest at the two ends of the longitudinal slot. Thus FIG. 6 shows the position (fully extended state of the telescopic cover) in which the stop 20a connected to the box 11 touches on the left-hand end of the longitudinal slot 19c and the stop 20b connected to the box 12 touches the right-hand end of the longitudinal slot 19c. In this way the extending movement of the telescopic cover in this embodiment is limited by the stop 20a, 20b which cooperates with the inner guide element 19. However, instead of this it is also possible for the extending movement of the telescopic cover to be limited in the manner explained with the aid of FIGS. 1 to 5 (by the rear wall of the box and the stripper of the next larger cover box) so that the stops 20a, 20b which cooperate with the guide element 19 which is constructed as a slide essentially only have the function of keeping the guide element 19 in the correct position between the boxes 11 and 12 and carrying it with them when the boxes are drawn apart and pushed together.

With the aid of the above description it should be understood that when the boxes 11 and 12 are pushed together the guide element 19 initially remains stationary whilst the stop 20a supported by the box 11 moves towards the right within the longitudinal slot 19c. When the stop 20a reaches the right-hand end of the longitudinal slot 19c it carries the guide element 19 with it in the further compressing movement of the box 11 until the box 11 and with it the guide element 19 are moved completely into the box 12.

The further embodiment illustrated in FIGS. 12 and 13 corresponds largely to the embodiment according to FIGS. 6 to 11. Therefore the same reference numerals have been used as in FIGS. 6 to 11 to designate the same components.

Figure 13B:
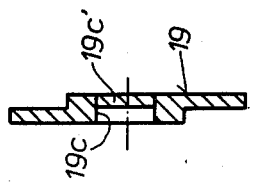
Figure 13A:
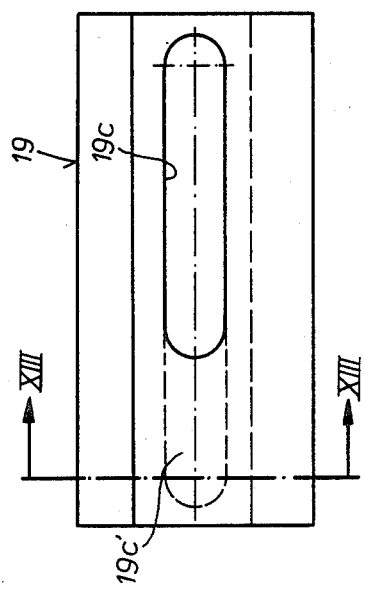

In the embodiment according to FIGS. 12 and 13 the inner guide element 19 in the form of a slide is of a different construction. The longitudinal slot 19c is covered towards the outer broad side of the inner guide element 19 in the part of the inner guide element which projects (dimension M) over the length of the next larger box (12) in the extended state of the boxes 11, 12. In FIGS. 13a and 13b the cover is designated by 19c'.

This cover 19c' of the part of the longitudinal slot 19c which projects in the extended state has the advantage that no shavings or foreign bodies can enter the slot 19c and thereby hinder the functioning. It will be seen from the FIG. 13 that the thickness of the cover 19c' is somewhat smaller than the half thickness of the guide element 19. Thus the movement of the stop 20a supported by the box 11 is not hindered by the cover 19c' whilst conversely the length of the cover 19c' is chosen so that the stop 20b supported by the box 12 can engage freely in the open part of the longitudinal slot 19c.

As can be seen from FIG. 12 in this embodiment the dimension M by which the guide element 19 projects over the box 12 in the extended state and the dimension M\* by which the guide element 19 projects over the box 11 are different. As in the embodiment described above, in the arrangement according to FIGS. 12 and 13 the inner guide element 19 is pushed right in in the compressed state of the boxes 11 and 12.

In the further embodiment of the invention illustrated in FIGS. 14 to 18 three guide elements 27, 28, 29 are again provided between the boxes 21, 22. Of these the guide element 27 is mounted on the outer surface of the side wall 24 of the box 21, the guide element 28 is mounted on the inner surface of the side wall 24 of the box 22, whilst the inner guide element 29 is constructed as a movable slide.

The shape of the guide elements 27 to 29 can be seen in detail from FIGS. 16 to 18. The two outer guide elements 27, 28 have lug-like stops 27a, 27b and 28a, 28b which come to rest on step-like projections 29a, 29b and 29c, 29d respectively of the inner guide element 29. The guide elements 27, 28 are constructed as strips of approximately L-shaped cross-section so that a groove 27c or 28c in which a flange 29e or 29f respectively of the guide element 29 engages is open downwards or upwards respectively.

As can be seen from FIG. 17b, the step-like projections 29a to 29d of the inner guide element 29, the thickness of which is at most equal to half the thickness of the guide element 29, are arranged in two different planes which lie one behind the other (or in FIG. 17b adjacent to one another) and are offset relative to each other by at least half the thickness of the inner guide element 29. This produces the co-operation shown in FIGS. 14 and 15 of the lug-like stops 27a, 27b of the guide element 27 with the step-like projections 29a, 29b of the guide element 29 and the co-operation of the lug-like stops 28a, 28b of the guide element 28 with the step-like projections 29c, 29d of the guide element 29.

If for example the box 21 is pushed into the box 22 from the fully extended state shown in FIG. 14, then first of all the guide element 29 in the form of a slide remains stationary until the lug-like stop 27a of the guide element 27 comes to rest on the step-like projection 29a of the guide element 29. In the further inward movement of the box 21 the guide element 29 is carried along by the guide element 27 until the box 21 is completely pushed into the box 22.

The length of the guide elements 27, 28 and 29 is chosen in this embodiment so that in the fully compressed state of the boxes the three guide elements 27, 28, 29 project by the dimension M' over the appertaining cover box. It is of course also possible within the scope of the invention to make the guide elements 27, 28, 29 the same length as the boxes 21, 22 as in the two previously described embodiments so that in the fully compressed state of the boxes the guide elements do not project over the boxes.

In the extended state of the telescopic cover the guide element 29 in the form of a slide projects by the dimension M over the left-hand end face of the box 22 and at the same time projects by the dimension M (or by a different dimension) over the right-hand end face of the box 21.

On the outer surface of the side wall 24 of the box 21 supporting the guide element 27 an additional guide element 30 is also mounted which is formed by a flat strip which corresponds to the length of the box, engages in a longitudinal groove 29g in the inner guide element 29 and also guides the latter in its movement.

Finally, FIG. 19 shows a further construction of the stop system for the telescopic cover which is facilitated by the guide system according to the invention.

FIG. 19 shows a telescopic cover consisting of ten boxes 31 to 40 in the compressed state. A strip 31a to 39a (also advantageously containing a stripper element) is provided on the underside of the front edge of each of the boxes 31 to 39. A step-like stop 32b to 40b which in the compressed state rests on a rear step surface 33c of the stop carried by the next smaller box is provided at the rear end of the boxes 32 to 40.

If the largest box 31 is moved out of the compressed position shown in FIG. 19 towards the left the strip 31a comes to rest on the surface 32d of the stop 32 and thus takes the next smaller box 32 with it. The same to the entrainment of the further boxes. When the telescopic cover is compressed, first of all the rear wall 31e of the box 31 with its bent upper part 31e′ comes into contact with the step surface 32c of the stop 32d and thus takes the box 32 with it. Then the stop 32b of the box 32 comes into contact with the step surface 33c of the box 33 and takes this with it.

As FIG. 19 shows, the box 36 alone has an extension 36f like a rear wall with which it is supported on a suitable stationary track. All the other boxes are constructed without such a support. However, this is only possible because the guide system according to the invention described with the aid of FIGS. 1 to 18 makes the individual adjacent boxes self-supporting. If necessary, therefore, the support for the central box 36 could be omitted if a telescopic cover is to be produced so as to be self-supporting over its whole length.

FIG. 19 also shows how a particularly small compressed dimension of the telescopic cover can be achieved by the omission of the rear walls of the individual boxes and the step-like construction of the stop-entrainment system. The guide system provided between the individual boxes can be constructed according to one of the variants described with the aid of FIGS. 1 to 18.

Numerous variants are possible within the scope of the invention. For example, for heavy constructions of the telescopic cover it may be advantageous to provide not three guide elements (as in the embodiments described above) for guiding two adjacent boxes but at least four guide elements each in a two-storey construction (i.e. one above the other).

In addition the outer guide element provided near the edge of the side wall of the box (thus the lower guide element in a horizontal arrangement of the telescopic cover) can also be constructed at the same time as a sliding element and be used for the slidably movable support for this box on a stationary guide surface. These outer guide elements projecting over the edge of the side wall of the box can serve not only for slidably movable support but also for sealing the boxes on the guide track.

In a vertically arranged telescopic cover the self-supporting construction achieved according to the invention has the particular advantage that it is no longer necessary to fasten the individual boxes of the cover on the vertical machine stand by releasable slides, particularly by engaging elements, which in the known constructions makes assembly and dismantling awkward. On the contrary, the telescopic cover according to the invention merely needs to be screwed on before the front of the stand for the machine tool and then rests as a continuous self-supporting unit with the guide element acting as a slide on the front of the stand.

A further embodiment of the invention is illustrated in FIGS. 20 and 21. Of the outer guide elements 47, 48 which in each case project by a specific dimension M over the length of the appertaining box 41 and 42 respectively, one guide element (47) is connected to the outer surface of the side wall of the box 41 and the other guide element (48) is connected to the inner surface of the side wall of the next larger box 42. In this embodiment the inner guide element is formed by a plurality of balls 49 which run in a guide track of circular cross-section provided between the guide elements 47, 48, and these balls 49 engage behind the guide elements 47, 48 (cf. FIG. 21). In order to prevent the balls 49 from falling out of the guide track between the guide elements 47, 48 a stop 50, 51 (which is advantageously releasable) is provided in each case at the right-hand end of the guide element 47 and the left-hand end of the guide element 48.

Instead of the balls provided in the embodiment of FIGS. 20 and 21, it is also possible to provide as an inner guide element rollers or elements of a gear-tooth system, for example pinions, which engage with the outer guide elements which are constructed as racks.

Furthermore, it should be pointed out that the cross-sectional shapes of the guide elements set out in the embodiments of FIGS. 1 to 18 should only be regarded as examples. For instance, instead of the step-like L shape of the guide elements, as can be seen in FIG. 20, an inclined boundary surface can also be provided between the guide elements which engage behind one another. In addition the inner guide element can be constructed for example as a sliding bar of circular cross-section. Thus the most varied designs are possible within the scope of the invention.

It is also possible to use different forms of the guide elements within one and the same telescopic cover. For instance in view of the increasing load on the individual boxes in a self-supporting construction, the guide elements can have an increasing thickness and/or length. In addition in telescopic covers with conventionally constructed rear walls more space is available behind the rear wall of the smallest box in the compressed state of the cover to accommodate projecting guide elements than behind the largest box; in such a case it can be advantageous for example to mount guide elements only on smaller boxes, whilst the larger boxes are provided with movable guide elements which do not project in the compressed state.

All in all it should be stressed that the invention makes it possible for the first time for the support, guide and sliding system of the telescopic cover to be largely (and if necessary completely) released from the stationary guide track and transferred into the telescopic cover itself. In this way the numerous difficulties are avoided which were caused in the known constructions by the high stresses on the guide tracks from lubricants (taking account of grinding and metal dust). The self-supporting telescopic cover according to the invention with the guide system integrated into this cover thus facilitates a significant protection of the stationary guide tracks.

A further embodiment of the invention is illustrated in FIGS. 22 to 26.

Three boxes 61, 62, 63 are illustrated between which two inner guide elements 64, 65 in the form of slides are arranged.

FIGS. 25 and 26 show the construction of these similarly constructed guide elements 64, 65 on the basis of the guide element 64. It consists of two slide parts 66, 67 of unequal length which are firmly connected to one another at one end by a connecting element 68. The two slide parts 66, 67 have the same cross-sectional profile, namely a rail-shaped profile, which is bent at right angles in the region of the two long edges. The two slide parts 66 and 67 are held parallel to one another by the connecting element 68 so that the distance between them permits the engagement of the side wall of the relevant box in the free space 69 between the slide parts 66 and 67.

If we first of all consider the inner guide element 64 in the form of a slide which is associated with the smallest box 63, it will be seen (cf. FIG. 23) that the long slide part 66 is located in the region of the inner surface and the short slide part 67 in the region of the outer surface of the side wall of the box 63.

This box 63 is provided on its inner surface with two outer guide elements 70, 71 which are fixed on the inner surface of the side wall of this box 63. The outer guide elements 70, 71 (like all the other outer guide elements described below) have the same cross-sectional profile as the slide parts 66, 67, so that all elements of the guide system can be produced with one single draw profile.

The guide element 70 has the same length as the long slide part 66. By contrast the guide element 71 is exactly as short as the slide part 67. The long slide part 66 of the inner guide element 64 engages with the outer guide elements 70, 71.

Two outer guide elements 72, 73 which also have the same length as the long slide parts 66 and engage with the short slide part 67 of the inner guide element 64 are arranged on the inner surface of the central box 62 in the lower half thereof. All in all, therefore, of the four outer guide elements 70, 71, 72, 73 with which the inner guide element 64 in the form of a slide engages, one outer guide element (namely 71) is constructed with a shortened length.

The side wall of the box 63 which is enclosed by the inner guide element 64 has a rearward recess 74 in which the connecting element 68 of the two slide parts 66, 67 engages in such a way that the inner guide element 64 does not project over the length of the appertaining box 63 in the compressed state of the cover (cf. FIG. 22).

If we now consider the guide provided between the boxes 61 and 62 it will be seen that the inner guide element 65 which encloses the side wall of the box 62 is arranged at a different height from the inner guide element 64. The guide element 65 is of similar construction to the guide element 64 which has already been described so that further description is unnecessary. The long slide part 66 of the guide element 65 is located in the region of the inner surface and the short slide part 67 in the region of the outer surface of the side wall of the box 62.

The guide element 65 engages with four outer guide elements 72, 75, 76 and 77. Of these the outer guide element 72 already mentioned and the guide element 75 are mounted on the inner surface of the side wall of the box 62, whilst the outer guide elements 76 and 77 are fixed on the box 61. The arrangement is such that the outer guide element 72 engages with both the guide elements 64 and 65 in slide form.

When the cover is extended the box 62 first of all moves towards the right with respect to the box 63 which may be assumed to be stationary (FIG. 22) and the guide element 64 in slide form is stationary at the beginning. After a certain extending movement the stripper 78 (cf. FIG. 24) provided in the region of the side wall of the box 62 comes to a stop on the left-hand end of the short slide part 67 of the guide element 64 in slide form. In the further extending movement of the box 62 (towards the right) the inner guide element 64 is entrained until it takes up the position indicate by broken lines in FIG. 22. In this position the extending movement of the boxes 62, 63 is limited by the stripper 78 provided on the inner surface of the box 62 coming on a stop on a rearward edge 79 of the box 63 (cf. FIG. 22) or an upwardly turned part 80 provided in the front region of the guide element 64 in slide form coming to a stop on the left-hand end of the short guide element 71.

When the cover is compressed a plate-shaped engaging piece 81 provided on the inner surface of the side wall of the box 62 (cf. FIG. 24) comes to a stop on the right-hand end of the short slide part 67 and pushes the guide element 64 again into the fully extended left-hand position in FIG. 22.

As can be seen from the above description, the guide system in this embodiment is constructed so that the inner guide elements in slide form do not move outwards between the boxes in any position during movement of the telescopic cover. Dirtying of the guide system and penetration of shavings and other foreign bodies are therefore excluded to the greatest possible extent.

The guide system can be dismantled in a simple manner by unscrewing the engaging piece 81.

It is of course also possible within the scope of the invention to place the guide system outside if necessary if—for example if the telescopic cover slips on shavings—there is a threat of dirtying from inside.

We claim:

1. In a telescopic cover for a way of a machine tool having a reciprocable operating part movable between two extremities, said covering comprising a plurality of relatively telescoping boxes, each of said boxes having a top wall from which depend two side walls, said boxes cooperating to provide a telescoping protective covering above and along each side of said way between telescopically compressed and expanded conditions at the extremities of movement of the operating part of said machine, confronting guide means at each side of each two adjacent boxes for guiding said boxes longitudinally, the improvement enabling said cover to provide an optimum overall compactness and a longitudinally small telescopically compressed cover dimension, and wherein:

(a) said guide means include longitudinally extending, confronting guide elements cooperating between the adjacent side walls at each confronting side of adjacent boxes, said confronting guide elements providing guiding grooves opening toward one another, (b) said guide means further comprising guiding elements extending into and cooperating between confronting ones of said guiding grooves for guiding and supporting the adjacent side walls, (c) at least one of said guiding elements at each side being extended from within each of said boxes a predetermined distance beyond and into the adjacent one of said boxes in the telescopically extended state of the two adjacent boxes to provide longitudinal guidance and support between said adjacent boxes, thereby avoiding excessive box overlap, (d) each of said guide means between the respective side walls of each adjacent pair of boxes being of extended depth for rigidity and of limited thickness to minimize the space required between such side walls for clearance and provide overall compactness of the assembly, (e) means cooperating between each two adjacent telescoping boxes for limiting the extended state of such two boxes while the guide elements of one box extend beyond that box in guiding and support relation into the other, and (f) means removably securing at least one of the guide elements at each side thereof for ease of disassembly.

2. Telescopic cover according to claim 1 wherein:
(a) two of said guide elements are secured to said one box and another guide element is secured to the other box; and
(b) all three guide elements extend over the whole length of one of said boxes.

3. Telescopic cover according to claim 2 wherein said two of said guide elements are secured to the outer surface of the side wall of said one box and a third guide element is secured to the inner surface of the side wall of the second box.

4. Telescopic cover according to claim 3 wherein said two guide elements are vertically spaced, the lower one of which has a upwardly open groove for the accomodation of said third guide element.

5. Telescopic cover according to claim 1 wherein the removable one of said guide elements is mounted on its box by means of screws.

6. Telescopic cover according to claim 1 wherein:
(a) of first and second guide elements one is secured to the outer surface of the side wall of the smaller box and the other to the inner surface of the side wall of the next larger box, and
(b) an inner guide element is formed by a slide which is slidably movable between two positions and in the extended state of the boxes projects a predetermined distance over the two boxes.

7. Telescopic cover according to claim 6 wherein the third guide element has a longitudinal slot in which two steps are accommodated, one of said stops being connected to one of said boxes and the other of said stops being connected to the other of said boxes, said stops being operable to entrain the third guide element during the outward movement of the boxes and limit such outward movement.

8. Telescopic cover according to claim 7 wherein each of said stops has a thickness which is at most equal to half the thickness of the longitudinal slot, said stops lying in two different planes offset relative to one another by half the thickness of the longitudinal slot.

9. Telescopic cover according to claim 8 wherein the longitudinal slot is completely open over its whole length.

10. Telescopic cover according to claim 8 wherein the longitudinal slot is covered at one side thereof.

11. Telescopic cover according to claim 6 including like stops on the first and second guide elements and like projections on the third guide element, said lug-like stops and said projections being engagable during extending movement of the boxes to limit such movement.

12. Telescopic cover according to claim 11 wherein the projections of the third guide element have a thickness equal at most to half the thickness of the third guide element and are arranged in two different planes which are offset relative to one another by half the thickness of the third guide element.

13. Telescopic cover according to claim 11 including a guide element accommodated in a longitudinal slot of a third element mounted on the outer surface of the side wall of the box which supports said first and second guide elements.

14. Telescopic cover according to claim 6 wherein the length of all three guide elements corresponds to the length of one of said boxes and the third guide element is accommodated within the confines of said one of said boxes in the compressed state of the boxes.

15. Telescopic cover according to claim 6 wherein the length of all three guide elements is greater than the length of any one of said boxes and each of the guide elements projects into the next larger box in the compressed state of the boxes.

16. Telescopic cover according to claim 1 wherein the smaller box has at the rear end of its top wall a stop engagable during extending movement with a strip on the underside of the front end of the next larger box providing said limiting means.

17. Telescopic cover according to claim 1 wherein said guide elements are at least four in number arranged in a two-storey construction.

18. Telescopic cover according to claim 1, wherein one of first and second guide elements are formed as a sliding element which serves for the slidably movable support of its associated box on a stationary guide surface.

19. Telescopic cover according to claim 1 wherein a third guide element is formed by a plurality of rotary members.

20. Telescopic cover according to claim 6 wherein a third guide element comprises two slide parts of unequal length joined together at corresponding ends by a connector, one of said slide parts engaging first and second guide elements on one box and the other of said slide parts engaging first and second elements on the next adjacent box.

21. Telescopic cover according to claim 20 wherein the two third guide elements between three successive boxes are positioned at different heights in such a way that both third guide elements engage a common guide element on the inner surface of the central box.

22. Telescopic cover according to claim 20, wherein of the four first and second guide elements which one third guide element engages, one of the first and second guide elements has a shorter length.

23. Telescopic cover according to claim 20, wherein the first and second guide elements and the two slide parts of the third guide element have the same cross-sectional profile.

24. Telescopic cover according to claim 22 wherein the shorter guide element has the same length as the shorter slide part of the third guide element and the longer guide elements have the same length as the longer slide part.

25. Telescopic cover according to claim 20 wherein the side wall of the largest box has a rearward recess in which said connector may be accommodated so that the third guide element does not project beyond the associated box in the compressed state of the cover.

26. Telescopic cover according to claim 20 wherein during extension of the cover a stripper at one end of the said next adjacent box engages one end of the shorter slide part and during compression of the cover engages a removable engaging piece on the next larger box at the other end of the shorter slide part.

27. Telescopic cover according to claim 26 wherein the extending movement is limited by the stripper engaging a rearward edge of the next smaller box and by an upwardly turned part provided in the front region of the third guide element engaging the short guide element.

* * * * *

UNITED STATES PATENT AND TRADEMARK OFFICE
CERTIFICATE OF CORRECTION

PATENT NO. : 4,722,452
DATED : February 2, 1988
INVENTOR(S) : Kurt Hennig et al

It is certified that error appears in the above-identified patent and that said Letters Patent is hereby corrected as shown below:

Column 1, delete lines 4 and 5; line 6, change "set out in the preamble" to -- to which the invention relates -- ; line 7, delete "claim 1"; line 9, after "the", second occurrence, insert -- boxes constituting the -- .

Column 7, line 4, after "same" insert -- applies -- .

Column 9, line 64, change "indicate" to -- indicated -- ; line 68, change "on", first occurrence, to -- to -- .

Column 11, line 16, change "a" to -- an -- .

Column 12, line 29, after "second" insert -- guide -- .

Signed and Sealed this

Twenty-sixth Day of July, 1988

Attest:

DONALD J. QUIGG

Attesting Officer     Commissioner of Patents and Trademarks